F. C. BRYAN.
Sulky-Plow.

No. 225,105. Patented Mar. 2, 1880.

WITNESSES
John A. Ellis
F. J. Masi

INVENTOR
Franklin C. Bryan
by E. W. Anderson
his ATTORNEY

UNITED STATES PATENT OFFICE.

FRANKLIN C. BRYAN, OF WINONA, MINNESOTA.

SULKY-PLOW.

SPECIFICATION forming part of Letters Patent No. 225,105, dated March 2, 1880.

Application filed January 6, 1880.

*To all whom it may concern:*

Be it known that I, FRANKLIN CLARK BRYAN, of Winona, in the county of Winona and State of Minnesota, have invented a new and valuable Improvement in Reversible Sulky-Plows; and I do hereby declare that the following is a full, clear, and exact description of the construction and operation of the same, reference being had to the annexed drawings, making a part of this specification, and to the letters and figures of reference marked thereon.

Figure 1:
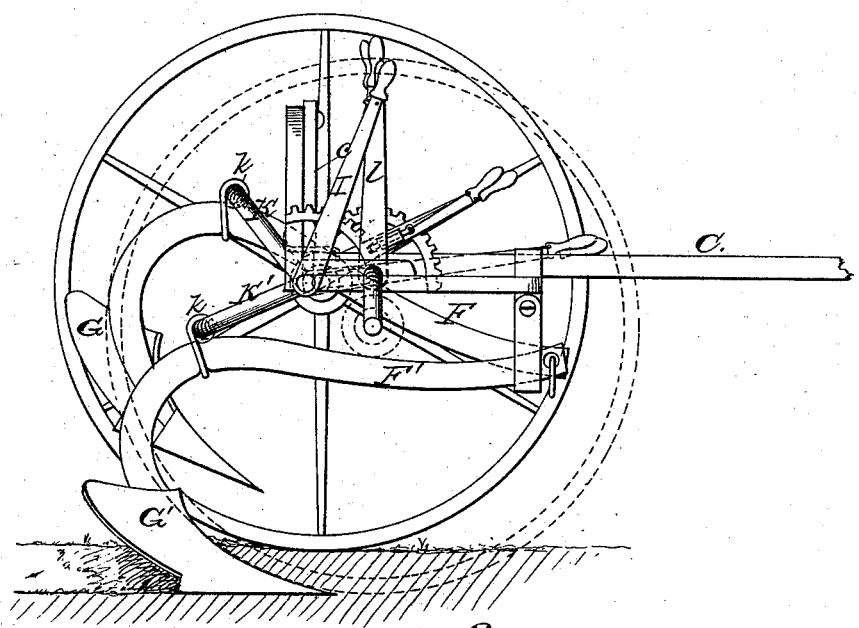
Figure 2:
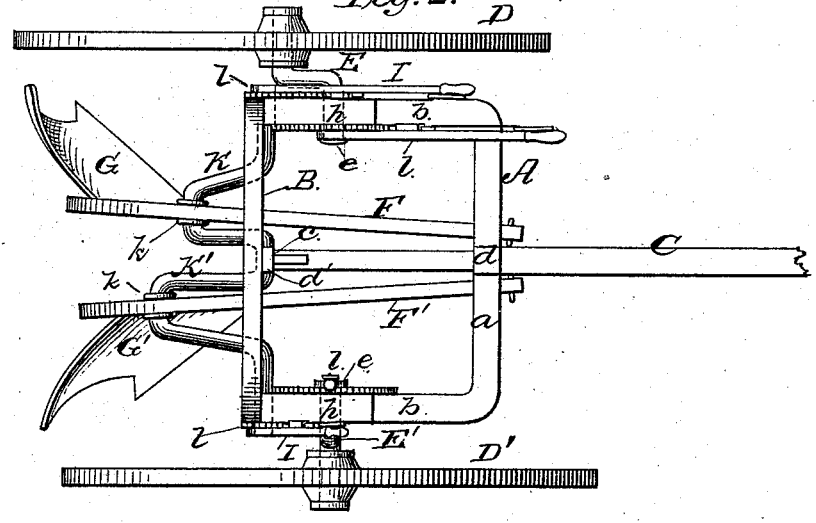

Figure 1 of the drawings is a representation of a side view of my improved reversible plow, and Fig. 2 is a plan view of the same.

This invention has relation to reversible sulky-plows.

The nature of the invention consists in the combination of the frame and independent crank-axles having separate operating-levers with the right and left plows and their beams, and independent plow-supporting cranks having separate operating-levers, and suitable catches for said levers, as hereinafter shown and described.

In the accompanying drawings, the letter A designates the frame, which consists of a transverse front bar, $a$, side bars, $b$, and an upward transverse bow, B, connecting the rear ends of the side bars. From the middle portion of the bow B extends downward a central vertical arm, $c$, the lower end of which is in line with the ends of the side bars $b$ where the bow commences.

C represents the tongue, which is stepped in suitable bearings $d$ and $d'$, respectively, in the front bar of the frame and in the vertical arm $c$. D D' indicate the wheels, which are pivoted to the ends of short crank-axles E E', which have horizontal journals $e$ bearing in suitable seats $h$ of the main frame in the middle or intermediate portions of the side bars. Each of these journals $e$ terminates in an operating-lever, $l$, which extends from its inner end, the crank-arm of the axle extending from the outer end of the journal in the opposite direction, as shown in the drawings.

F F' represent the beams, respectively, of the right and left plows G G', which are connected by suitable links $k$ to the supporting-cranks K K', which are independent of each other, one being on each side of the frame, and journaled by its outer end to the side bar in a seat, and by its inner end to the central arm of the frame in a seat at the end of said arm. The outer ends of these cranks K K' terminate in operating-levers I, which extend from the outer sides of the side bars. Suitable holding-catches are constructed on the frame to hold the levers in position.

In operating this machine, the plows are alternately depressed into working position by means of the operating-levers of the crank-axles.

When the left-hand plow is in use, being depressed, as stated, the right-hand plow is raised out of the ground. At the end of the furrow the sulky is turned around and the left-hand plow is raised out of the ground. The right-hand plow is now depressed and the right-hand wheel lowered by means of the crank-axle on that side, as this wheel will now run in the furrow. The left-hand wheel-crank is raised by means of its lever, so as to bring the frame into level position. The sulky is now moved in the opposite direction to that in which it traveled when the left-hand plow was in operation, and the furrow-slice will be laid on the same side.

In this manner it is designed to dispense with or avoid all "dead furrows" and ridges, and to save much time in going across the ends of a "land."

Having described this invention, what I claim, and desire to secure by Letters Patent, is—

In a reversible sulky-plow, the combination of the frame A and independent crank-axles E E', having separate operating-levers $l$, with the right and left plows G G' and their beams F F', independent plow-supporting cranks K K', having separate operating-levers I, and suitable catches for said levers, all arranged substantially as specified.

In testimony that I claim the above I have hereunto subscribed my name in the presence of two witnesses.

FRANKLIN CLARK BRYAN.

Witnesses:
J. N. MAYBURY,
L. E. VANCE.